United States Patent
Lee (12) 
(10) Patent No.: US 6,684,089 B1
(45) Date of Patent: Jan. 27, 2004

(54) CASE STRUCTURE OF A DATA PROCESSING DEVICE

(75) Inventor: Yung-Tang Lee, Taipei (TW)

(73) Assignee: Inventec Appliances Corp., Taipei (TW)

( * ) Notice: Subject to any disclaimer, the term of this patent is extended or adjusted under 35 U.S.C. 154(b) by 493 days.

(21) Appl. No.: 09/711,292

(22) Filed: Nov. 14, 2000

(51) Int. Cl.⁷ .................................................. H04B 1/38
(52) U.S. Cl. .............................. 455/575.3; 455/575.8; 455/90.3; 455/347; 379/433.13; 379/451; 361/724
(58) Field of Search ........................ 455/90.3, 550, 455/575.1–575.8, 347, 348, 343; 379/445, 451, 433.11–433.13; 361/724–727, 728, 736, 753

(56) References Cited

U.S. PATENT DOCUMENTS

| | | | | |
|---|---|---|---|---|
| 4,063,788 A | * | 12/1977 | Latasiewicz et al. | 312/7.1 |
| 4,446,333 A | * | 5/1984 | Kessler | 379/444 |
| D306,294 S | * | 2/1990 | Watanabe | D14/148 |
| 5,342,707 A | * | 8/1994 | Brooks | 439/97 |
| D366,463 S | * | 1/1996 | Ive et al. | D14/345 |
| 5,535,439 A | * | 7/1996 | Katz | 455/117 |
| 5,555,157 A | * | 9/1996 | Moller et al. | 361/683 |
| 5,692,046 A | * | 11/1997 | Jambhekar | 379/433.13 |
| 5,706,332 A | * | 1/1998 | Nagai | 455/575.3 |
| 5,809,403 A | * | 9/1998 | MacDonald, Jr. et al. | 455/575.7 |
| D425,056 S | * | 5/2000 | Edwards et al. | D14/138 |

FOREIGN PATENT DOCUMENTS

| | | | | |
|---|---|---|---|---|
| JP | 405335996 A | * | 12/1993 | 455/90 |
| JP | 406152459 A | * | 5/1994 | 455/90 |

\* cited by examiner

*Primary Examiner*—Vivian Chin
*Assistant Examiner*—Charles Craver
(74) *Attorney, Agent, or Firm*—Birch, Stewart, Kolasch & Birch, LLP (57) ABSTRACT

The present invention is a case structure of a data processing device, which has a cover made of a highly elastic material and directly formed on the case whereby the cover can be bent and set at the top or bottom of the case.

8 Claims, 8 Drawing Sheets

CASE STRUCTURE OF A DATA PROCESSING DEVICE

BACKGROUND OF THE INVENTION

1. Field of Invention

The present invention relates to a case structure of a data processing device and, in particular, to the case of portable electronic data processing devices such as the personal digital assistant (PDA).

2. Related Art

With the advance in modern technologies, information industry has entered the post PC age. Portable electronic data processing devices such as the hand-held personal computer (HPC), the personal digital assistant (PDA), and so on have gradually replaced the conventional desktop personal computers or laptop computers.

The HPCs and PDAs are about the palm size. They have the advantage of easy to carry. As the wireless LAN develops, in addition to data processing and storage, they can further obtain real-time information at any place any time. With a transmission interface (infrared port or wire), they can exchange information with the office or home desktop PCs. Therefore, such devices have become a necessary tool for businessmen.

Currently, the HOC or PDA generally has a long rectangular host. The host has a liquid crystal display (LCD). Since the volume of the host is not too big, in order for the user to clearly see the information shown in the display, the display usually occupies most of the area. Therefore, the host is usually equipped with only a few keys. However, such few keys do not satisfy the needs for all operations. The LCD is thus usually a touch-control screen so that the user can use a touch pen to write on the screen to give commands to the host. Most of the HPCs or PDAs are kept in a carrying bag when not in use. There is no particular protection for the LCD. So the LCD may be broken due to pressure or knocks.

There is a PDA entitled "Info Touch" presented by Eten Corp. that has a protective cover pivotally installed on one side of the host to protect the LCD when the host is not in use. The cover is a plan plate. Since the host has a thickness, the bottom on one side of the host is installed with a first axis connecting to a connecting board. The other end of the connecting board is installed with a second axis that then connects to the protective cover. Therefore, one has to use these two axes and a connecting board to fold the cover at the bottom of the host when using the PDA. It has a rather complicated structure and is hard to assemble. So the manufacturing cost is higher.

SUMMARY OF THE INVENTION

In view of the foregoing, it is a primary object of the invention to provide a case structure for a data processing device.

According to the invention, the case structure for a data processing device includes a case and a protective cover. The case is composed of an upper case and a lower case. The protective cover is made of a highly elastic material and directly formed on the upper case. Utilizing the highly elastic feature, the protective cover can be directly bent and set at the top or bottom surfaces of the case to protect the LCD on the top or to be kept at the bottom of the case while in use, respectively.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

First Embodiment

Figure 1:
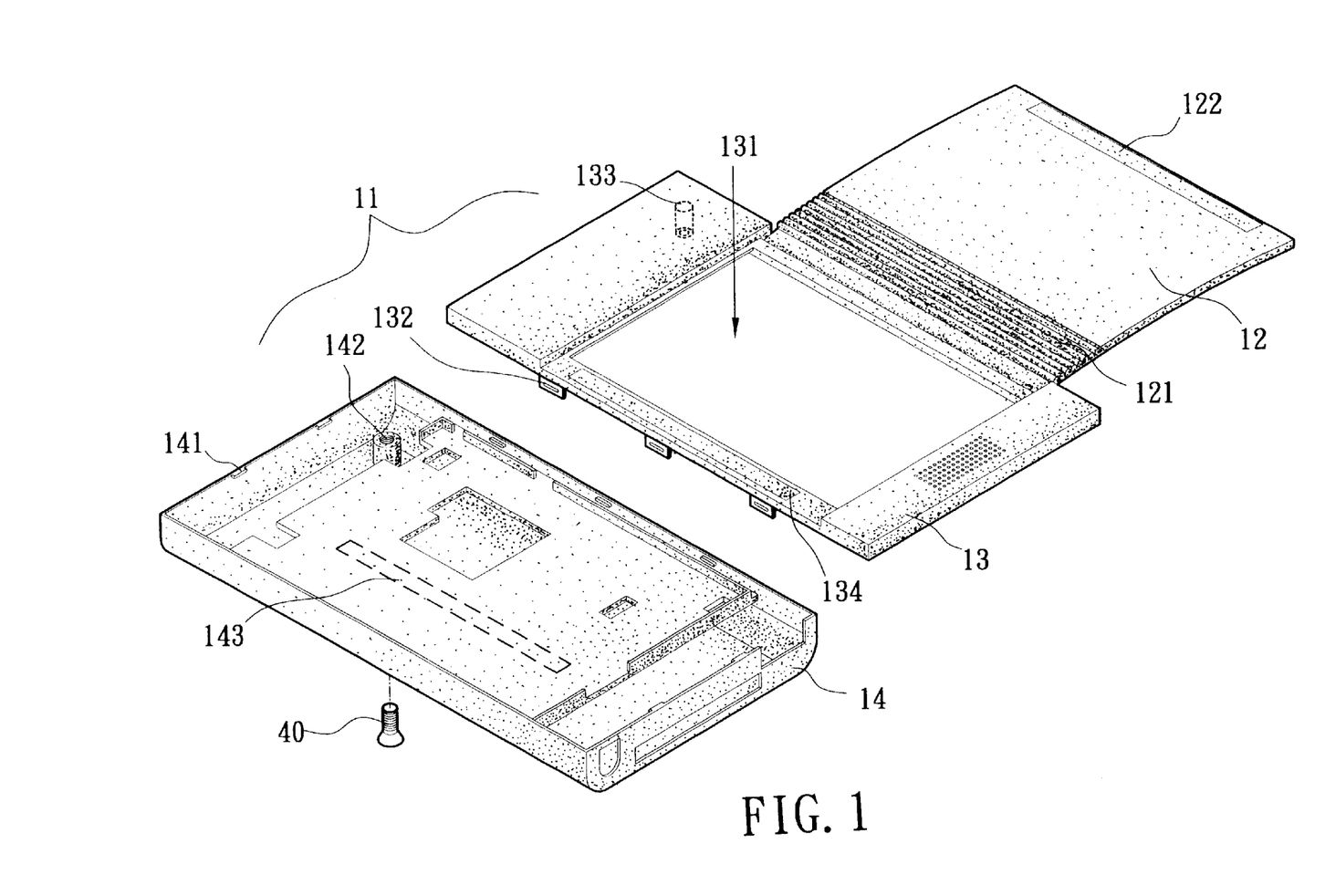
FIG. 1 is a schematic view showing the composition of a first embodiment structure of the invention.
Figure 2:
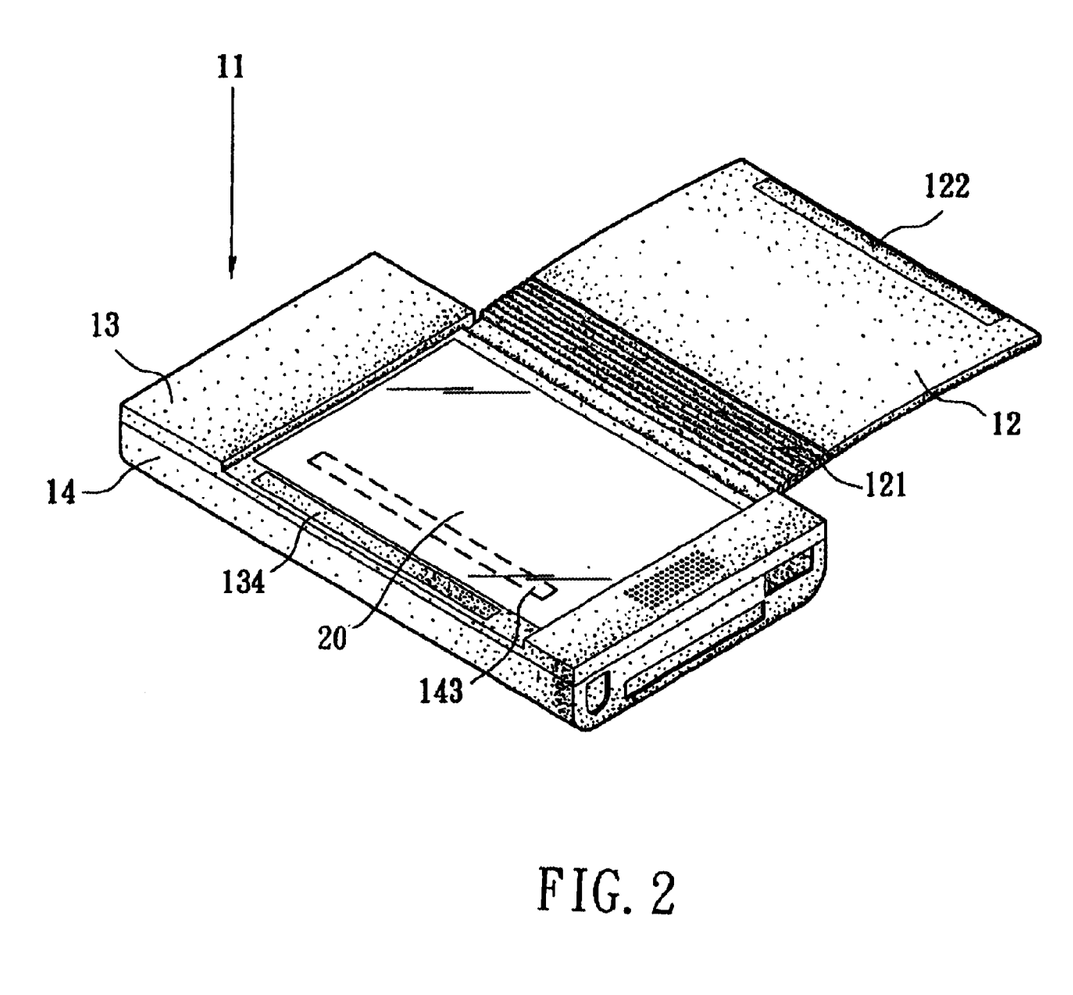
FIG. 2 is a schematic view of the first embodiment structure in FIG. 1.

The data processing device case structure disclosed herein is applied to electronic data processing devices such as the hand-held personal computers (HPCs), the personal digital assistants (PDAs), etc. As shown in FIGS. 1 and 2, the case structure in the current embodiment includes a case 11 for setting a main board, a processor and memory needed for a data processing device and a protective cover 12 directly formed on the case 11.

The case 11 is composed an upper case 13 and a lower case 14, which are made by plastic injection molding so that they can combine and form an space to set electronic devices such as a main board, a processor and memory. The lower case 14 is roughly a hollow long rectangular case. The boundary of the top of the lower case 14 is formed with a plurality of hooks 141. Its interior has at least one screw hole 142. The hooks 141 and the screw hole 142 are provided for the combination with the upper case 13. The upper case 13 is also a hollow long rectangular case that matches with the lower case 14. A long rectangular opening 131 is formed on the upper case 13 for setting a LCD 20. The boundary at the bottom of the upper case 13 is formed with a plurality of hook holes 132 corresponding to the hooks on the lower case 14. Its interior has at least a screw base 133 that corresponds to the screw hole on the lower case 14. The upper case 13 and the lower case 14 are combined together through the hook holes 132 and the hooks 141. A screw 40 is also used firmly fix the upper case 13 and the lower case 14 through the screw hole 142 on the lower case and the screw base 133 on the upper case 13 into a case 11 for a data processing device.

The protective cover 12 is made of a highly elastic material, such as rubber. It is directly formed along the rim on one side of the upper case 13 by injection molding. So a hard material (plastic) and an elastic material (rubber) are manufactured into a single body of the upper case 13 and the protective cover 12. The protective cover 12 is formed with a plurality of ribs 121 near the connecting side to the upper case so that the connecting portion between the protective cover 12 and the upper case 13 has a better strength and a smaller curving radius.

Figure 3A:
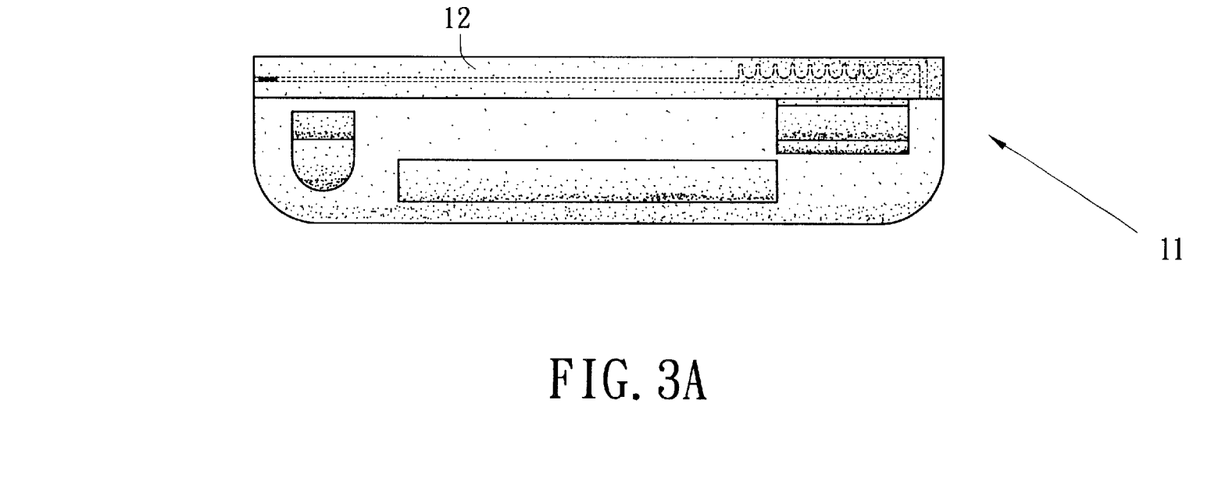
FIGS. 3A and 3B schematically show how to set the protective cover in the first embodiment shown in FIG. 1.
Figure 3B:
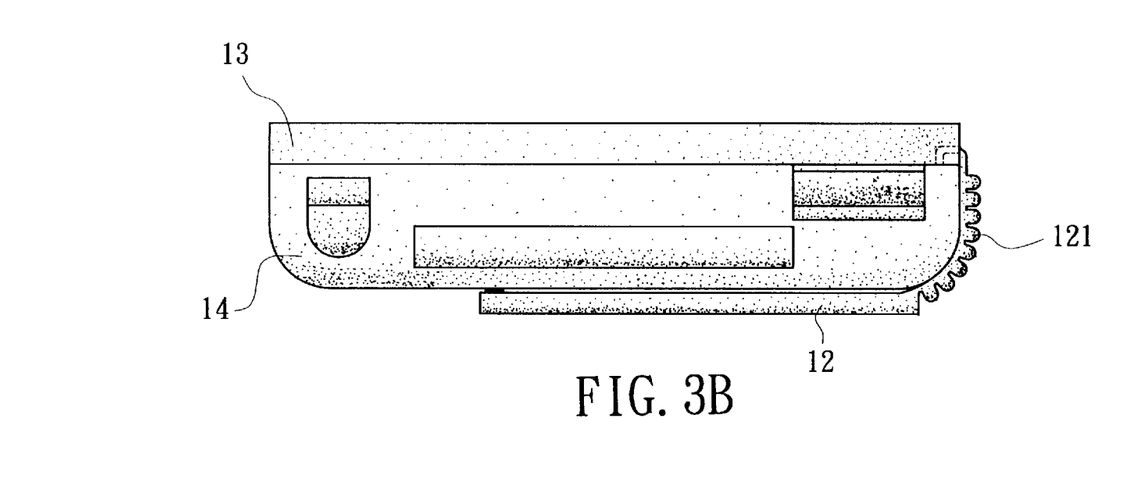

Therefore, with the elastic property, the protective cover 12 can be bent upward and attached onto the top surface of the case 11 (as shown in FIG. 3A). That is, it covers the LCD 20 to protect the LCD 20. This position of the protective cover 12 is called the protective position. The protective cover can also be bent downward and kept under the bottom surface of the case 11 so that the user can use the data processing device (as shown in FIG. 3B). This position of the protective cover 12 is called the use position.

In order to fix the protective cover 12 at the protective position or the use position, the free end of the protective cover 12 is installed with an iron chip 122 and the corresponding positions on the upper case 13 and the lower case 14 are provided with magnets 134, 143. When the protective cover 12 is at the protective position or the user position, the magnets 134, 143 on the upper case 13 and the lower case 14 can attract the iron chip 122 on the protective cover 12 for the protective cover 12 to be fixed thereon.

Second Embodiment

Figure 4A:
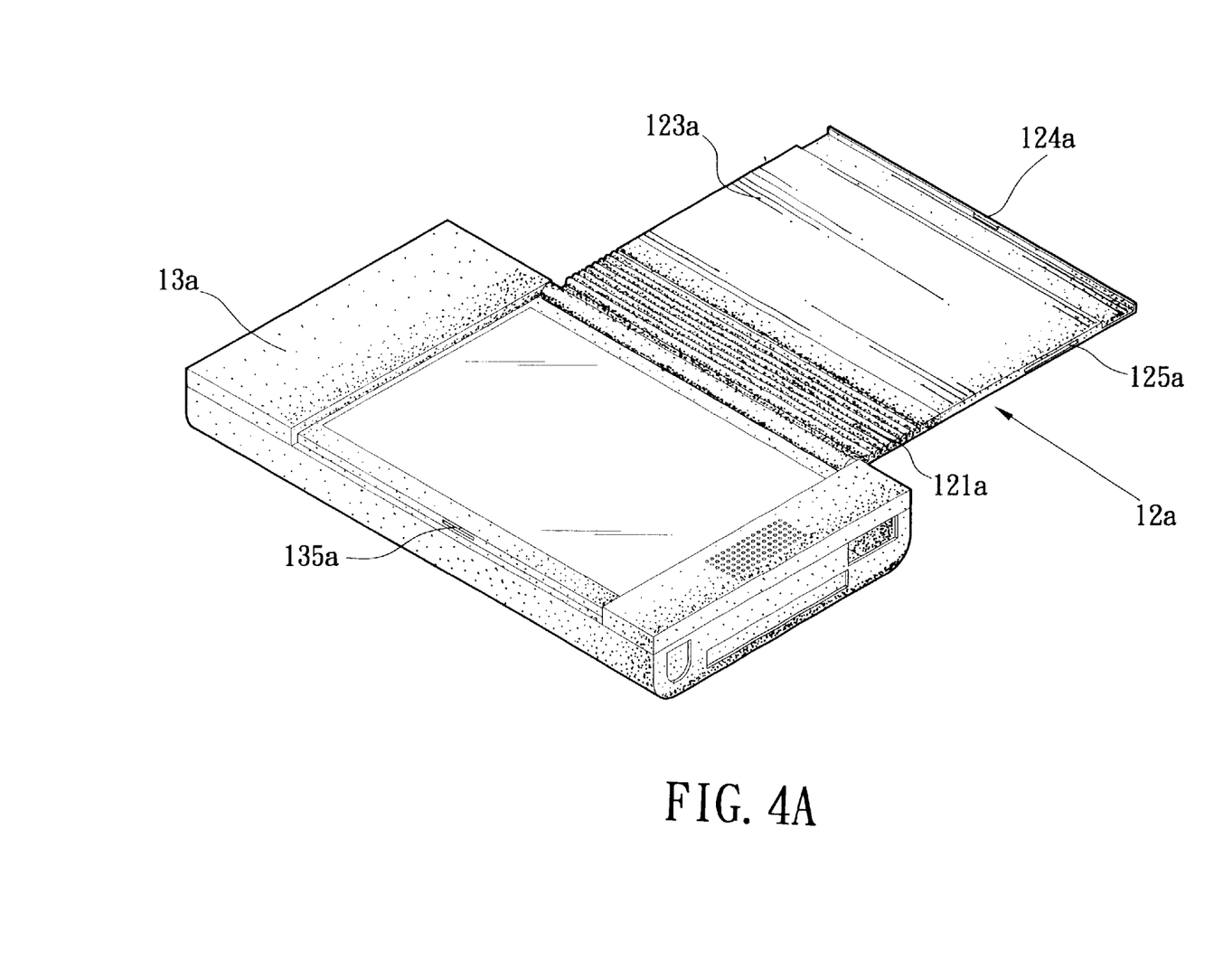
FIG. 4A is a schematic view of a second embodiment structure of the invention.
Figure 4B:
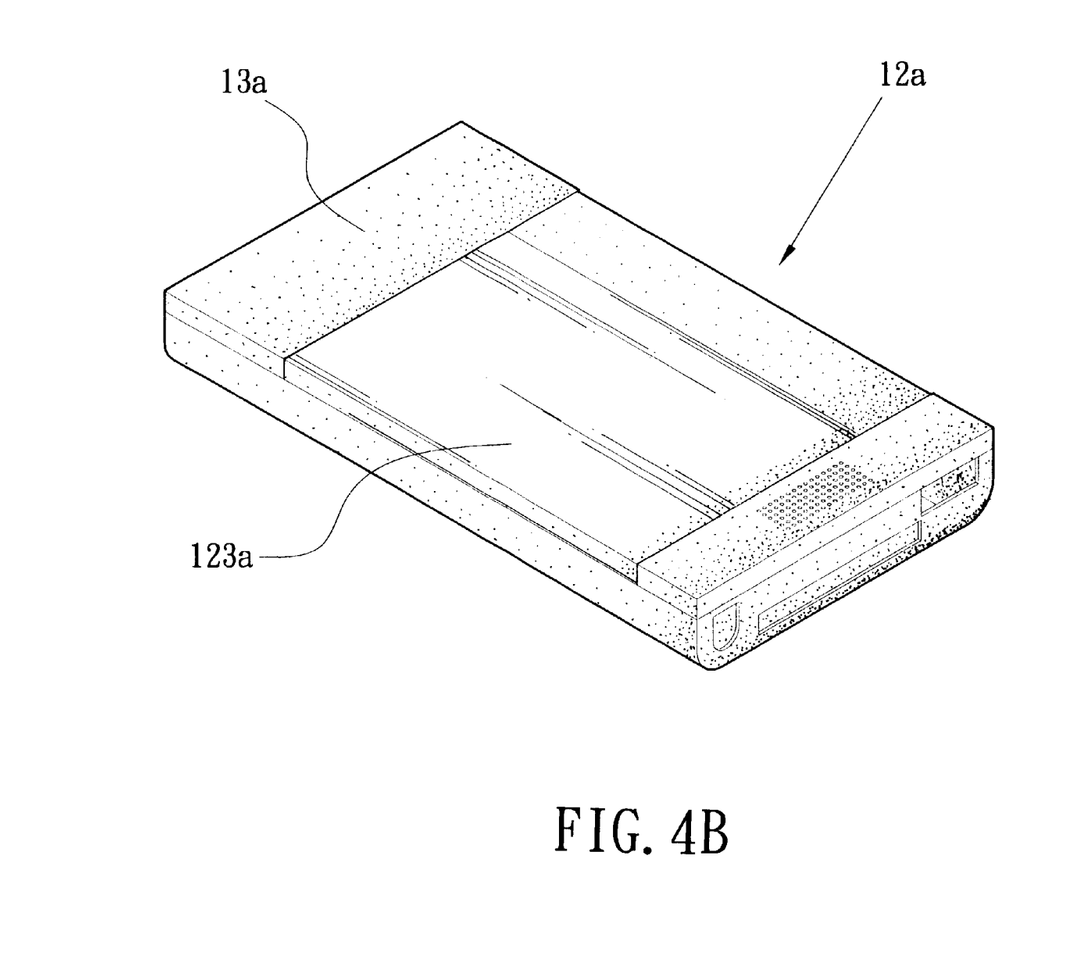
FIG. 4B shows a schematic action diagram of FIG. 4A.

The protective cover 12 disclosed in the first embodiment is fully made of a highly elastic rubber material and directly formed on the case 11. Therefore, connecting parts such as an axis are not needed. The second embodiment of the invention can further strengthen the protection for the LCD 20. As shown in FIGS. 4A and 4B, a covering plate 123a made of a hard material, such as plastic, is directly formed near a plurality of ribs 121a on the protective cover 12a of the second embodiment. Using the hardness of the covering plate 123a, the protective cover 12a can provide a better protection for the LCD 20 when placed at the protective position.

Figure 5A:
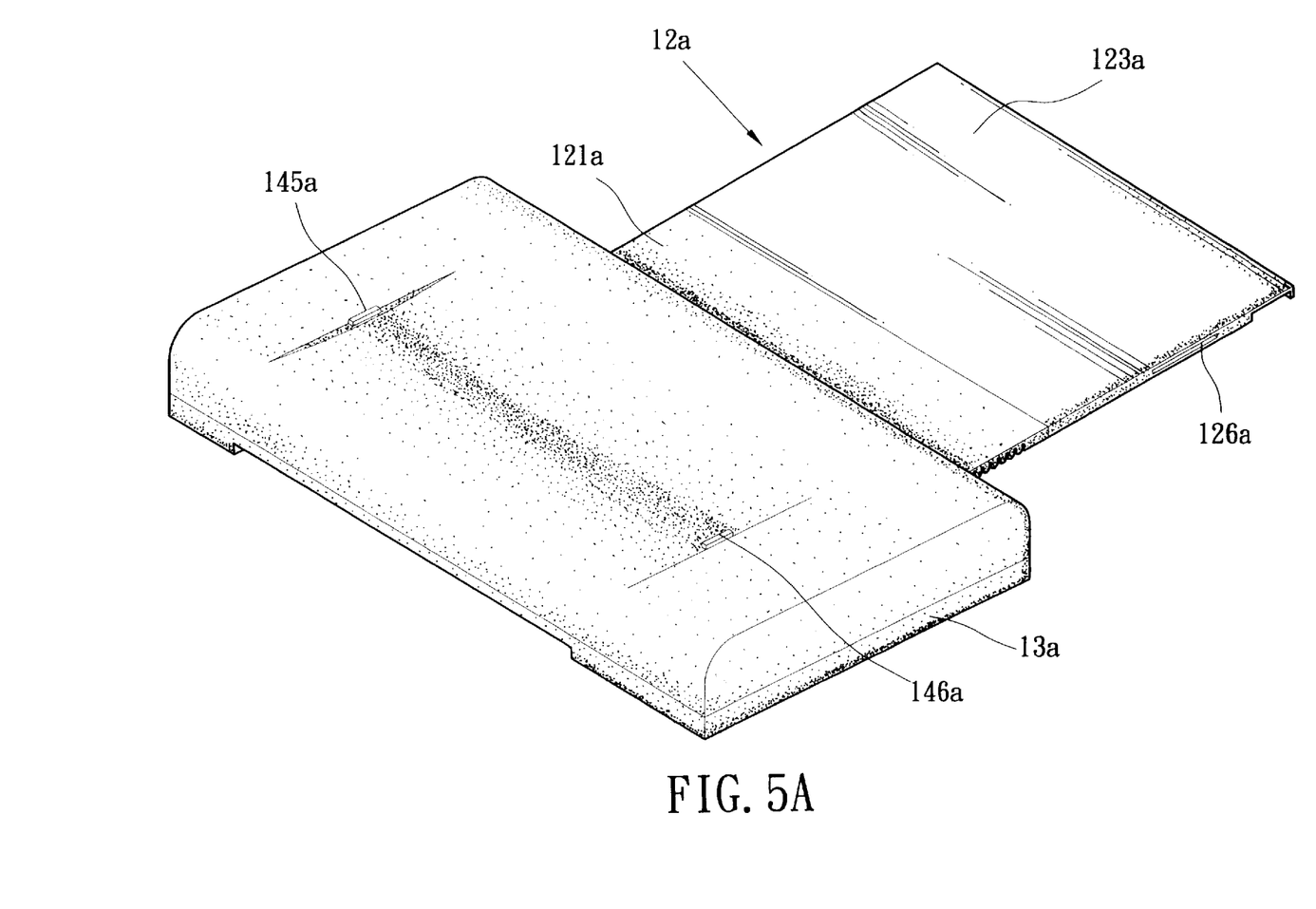
FIG. 5A is a schematic view of the second embodiment in FIG. 4A from another perspective angle.
Figure 5B:
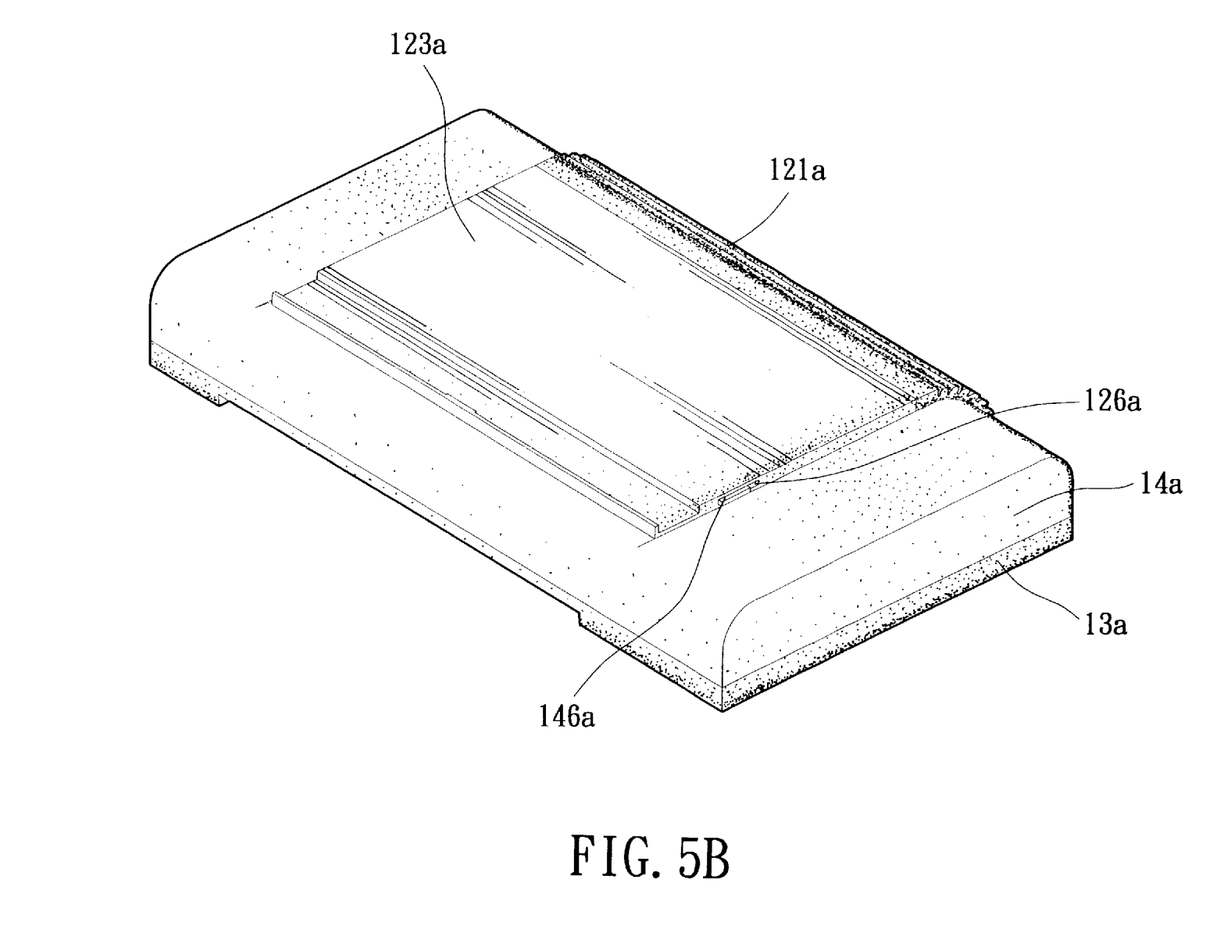
FIG. 5B shows a schematic action diagram of FIG. 4A.

Furthermore, the second embodiment also modifies the connection means of magnets and an iron chips used in the first embodiment. A hook 124a is provided on the free end of the covering plate 123a with hook holes 125a, 126a (FIG. 4a, FIG. 5a) formed on both sides. A hook hole 135a is provided at the position on the upper case 13a that corresponds to the hook 124a. Two hooks 145a, 146a are provided at the positions on the lower case 14a that correspond to the hook holes 125a, 126a (FIG. 5A). When the protective cover 12a is at the protective position, the hook 124a of the covering plate 123a can hold the hook hole 135a on the upper case 13a so as to fix the covering plate 123a at the protective position (see FIG. 5B). When the protective cover 12a is at the use position, the hooks 145a, 146a on the lower case 14a can hold the hook holes 125a, 126a on the covering plate 123a, fixing the covering plate 123a at the user position.

Third Embodiment

Figure 6:
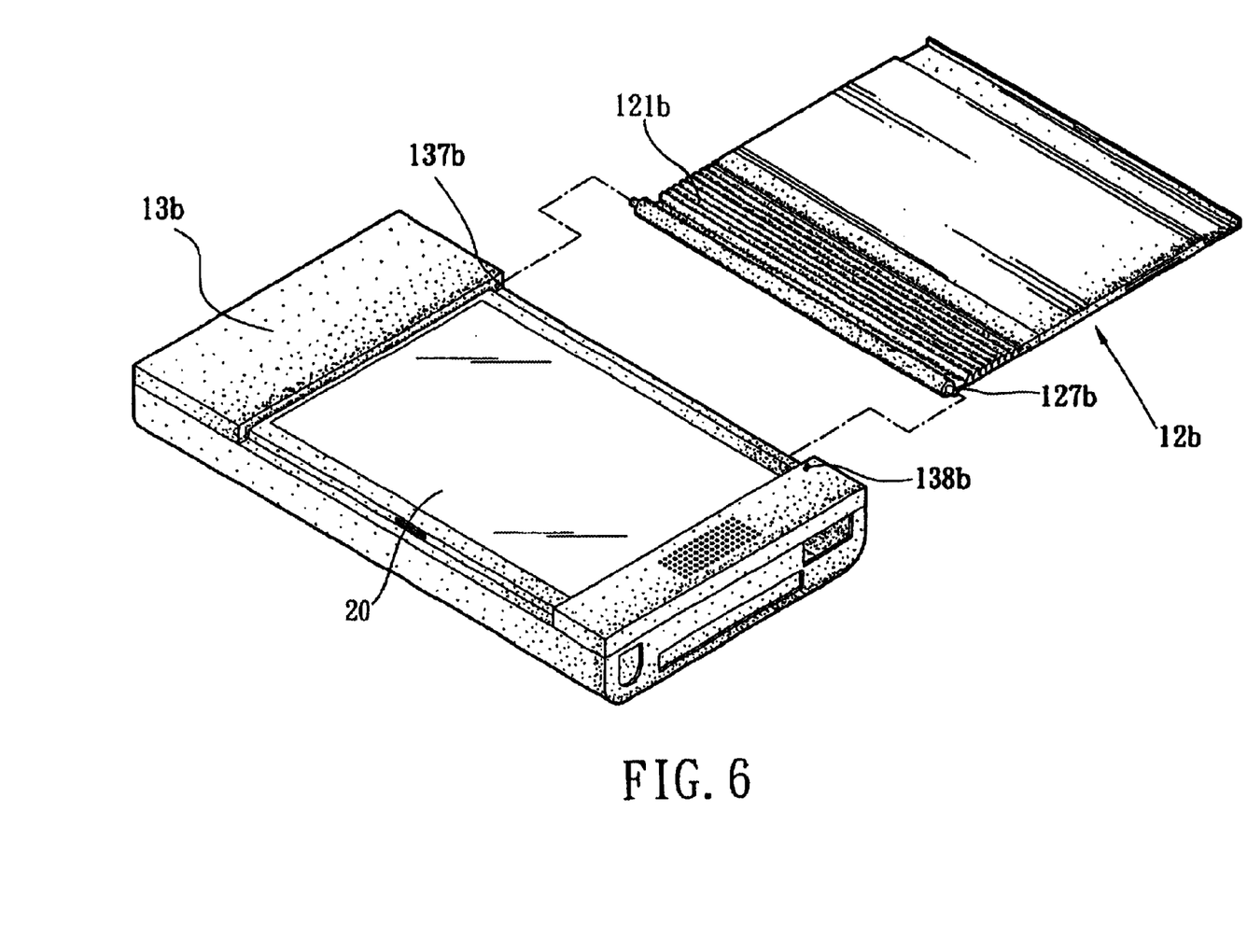
FIG. 6 is a schematic view showing a third embodiment structure of the invention.

The protective covers 12, 12a in the first and second embodiments are directly formed on the upper cases 13, 13a, respectively. The protective cover 12b in the third embodiment is pivotally connected onto the upper case 13b, as shown in FIG. 6. The protective cover 12b is embedded with an axis 127b along the rim of ribs 121b and protruding from both ends. The upper case 13b is formed with holes 137b, 138b at positions corresponding to the axis 127b. The protective cover 12b is pivotally installed on the holes 137b, 138b through the axis 127b so that the protective cover 12b can be placed at either the protective position or the use position.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A case structure for a data processing device comprising:

a case, which has a space for setting electronic devices;

a protective cover, which is highly elastic and directly formed on one side of the case, wherein the protective cover can be bent and moved between a protective position to cover the top surface of the case and a use position to cover the bottom surface of the case; and a hard covering plate protruding from ribs of the protective cover wherein one end of the covering plate is provided with a hook and opposite sides of the covering plate are provided with hook holes, said case being provided with a hook hole and two hooks with the hook hole of the case corresponding to a position of the hook of the covering plate when the protective cover is in a protective position, and said two hooks of said case corresponding to a position of said hook holes of said covering plate when the protective cover is in a use position.

2. The case structure of claim 1, wherein the case is composed of an upper case and a lower case.

3. The case structure of claim 2, wherein the upper case has an opening for setting a LCD.

4. The case structure of claim 2, wherein the boundary at the bottom of the lower case has a plurality of hooks and the boundary at the bottom of the upper case has hook holes corresponding to the hooks for the hooks to hold, combining the upper case and the lower case.

5. The case structure of claim 2, wherein the upper case has at least one screw base and the lower case has a screw hole corresponding to the screw base so that a screw can be put into the screw base through the screw hole, combining the upper case and the lower case.

6. The case structure of claim 2, wherein the connecting portion between the protective cover and the case is formed with a plurality of ribs.

7. The case structure of claim 1, wherein the free end of the protective cover is embedded with an iron chip and the corresponding positions at the protective position and the use position on the case are provided with a magnet, respectively, the magnet attracting the iron chip so as to fix the protective cover at the protective position and the use position properly when the protective cover is at the protective position and the use position, respectively.

8. The case structure of claim 1, wherein one end of the protective cover has an axis and the corresponding position on the case is formed with holes so that the protective cover can be pivotally installed onto the holes through the axis, enabling the protective cover to move between the protective position and the use position.

* * * * *